US006588869B1

(12) United States Patent
Batra et al.

(10) Patent No.: US 6,588,869 B1
(45) Date of Patent: Jul. 8, 2003

(54) FRONT ACCESSIBLE, STACKABLE, PRINTER/SCANNER/FAX

(75) Inventors: Sanjay Batra, Chicago, IL (US); Brian A. Bennett, Smithland, IA (US); Anton Poole, Dakota Dunes, SD (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/186,841

(22) Filed: Nov. 5, 1998

(51) Int. Cl.[7] .......................... B41J 29/13; B41J 29/02; B41J 29/12; B41J 3/39; H04N 1/034
(52) U.S. Cl. .......................... 347/3; 347/108; 400/691; 400/692
(58) Field of Search ................................ 347/1–3, 108, 347/170, 222; 400/691–693; 399/1, 107, 124

(56) References Cited

U.S. PATENT DOCUMENTS

| | | | | |
|---|---|---|---|---|
| 5,017,033 A | * | 5/1991 | Hermann et al. | 400/693 |
| 5,038,208 A | * | 8/1991 | Ichikawa et al. | 358/751 J |
| 5,124,802 A | * | 6/1992 | Ito et al. | 358/298 |
| 5,614,992 A | * | 3/1997 | Kikuchi et al. | 399/124 |
| 6,012,792 A | * | 1/2000 | Sievert et al. | 347/3 |
| 6,052,552 A | * | 4/2000 | Ohsumi et al. | 399/394 |
| 6,120,201 A | * | 9/2000 | McKay et al. | 400/691 |
| 6,148,066 A | * | 11/2000 | Di Santo et al. | 379/93.19 |
| 6,168,327 B1 | * | 1/2001 | Tsuzuki | 400/188 |

OTHER PUBLICATIONS

Cullman, D. E., Novell@Kistserv.Syr.Edu, Dec. 6, 1997.*

* cited by examiner

Primary Examiner—Benjamin R. Fuller
Assistant Examiner—Alfred E Dudding
(74) Attorney, Agent, or Firm—Scott Charles Richardson; Richard E. Billion; Schwegman, Lundberg, Woessner & Kluth

(57) ABSTRACT

A printer includes a housing which has a user access surface. Attached to the housing is a printer which includes a paper path. The printer also includes a paper input tray and a paper output tray. Both the paper trays are accessible from the user access surface. The user access surface also has an access panel within the user access surface. The paper path is positioned within the housing so that it is accessible through the access panel. The printer cartridges which contain the material used to make an image on the paper, such as a toner cartridge for use with a laser printer or one or more ink wells for use with an ink jet printer, are also positioned within the housing of the printer so as to be near the user access surface. The printer cartridges are accessible through the access panel. Optionally, the printer cartridges could also be accessed through a special panel in the user access surface. The user access surface also includes at least one control for controlling a function of the printer and a status indicator for indicating the status of the printer so that the function of the printer can be controlled from the user access surface and so that the status indicator can be read from the user access surface of the housing.

20 Claims, 7 Drawing Sheets

FRONT ACCESSIBLE, STACKABLE, PRINTER/SCANNER/FAX

FIELD OF THE INVENTION

The present invention is related to computer systems and computer peripheral devices. In particular, the present invention is related to printers and combination printer/scanner/fax machines.

BACKGROUND OF THE INVENTION

Several current trends are affecting the current designs of computer system products. One trend is that televisions and entertainment centers are increasingly intelligent. In other words, televisions and entertainment centers now include microprocessor control. Microprocessors are also becoming more capable as well as more affordable. Today's microprocessors are more able than ever before and can handle large numbers of different types of operations in parallel. These microprocessors are being designed into all sorts of individual appliances as well as individual stereo components. In a typical home entertainment system there may very well be a number of different microprocessors in the different components performing the same or similar functions.

Another trend is that home entertainment components and computers are merging. One design point associated with this trend is that duplication of functionality is avoided by designing in today's more powerful microprocessors to integrate the operations for the various home entertainment components. A few short years ago, the idea that televisions and computers would merge seemed to be a prediction thought to be well into the future. Now this prediction has become a reality. One currently available system is a product available from Gateway 2000 called the Destination product.

Gateway 2000's Destination product is a multipurpose computer system provided with circuitry to control consumer electronics, such as a large monitor or television for group interaction and of text, graphics and video in a home entertainment environment. The merged home entertainment and computer products, such as Gateway 2000's Destination product are being designed for use in a home entertainment environment since people are using these systems in living rooms rather than home offices. In other words, combining a computer with a home entertainment system has had the effect of moving the home personal computer off of the desk in home office and onto the shelves or into the racks of the home entertainment center in the main living space of the users home. This also means that the peripheral devices normally used with the computers will also be placed on the shelves or in the racks of the users home entertainment center.

Using today's printers in a home entertainment environment has its problems. Current designs are not conducive to placing a printer on a shelf or in the rack of today's home entertainment centers. Currently available printers have a paper tray for input of paper and an output tray. Sometimes these two paper trays are on the same side of a printer. Such a printer could be used on a shelf in a home entertainment center. However, many other designs use an input tray located at the front of the printer and an output tray located on the backside of the printer. Using this type of printer would require the user to remove the printer from the shelf or rack mount of the home entertainment center each time they wanted paper output. This would be very impractical.

Another design aspect which is not conducive to placing today's currently available printers in the rack or on the shelf of today's home entertainment environment is access to the inner housing of the printer to remove paper jams. Access to the mechanical paper handling path usually requires removing large panels or unlatching large portions of the printer and rotating a whole assembly out of the way to enable the user to peer into the deep recesses of the printer in search of a paper jam. The large panels or large assembly portions that are rotated out of the way rarely face the front of the printer. If a current printer is placed in a rack or on a shelf, the user would have to remove the printer from the rack or shelf to clear a paper jam.

Another problem is that current printers require access from the top of the machine to do some of the more routine maintenance chores such as changing a toner cartridge in a laser printer or changing the ink wells on an ink jet. The user that places such a printer in a home entertainment center would then be required to remove the printer from the rack or the shelf of the home entertainment center to perform routine maintenance.

Still another problem is that the control buttons and printer status buttons are almost always placed on the top side of the printer. If the shelves are tightly spaced, as they are in a rack or on the shelves of a home entertainment center, it is difficult to see the control buttons or status indicators. A paper jam or an indication that a printer is out of paper may go undetected for quite some time just because the status indicators can not be seen.

Printers are also now being provided with the capability to act as scanners and fax machines. There are many products on the market that combine all or some of these capabilities. The problems spoken of above with respect to printers are also associated with these combination products, such as printer/scanner/fax machines.

As more users move their computer systems from the desktop in the home office to the home entertainment center in the main living space, demand for a printer or printer combined with a scanner and fax that is more conducive to being mounted in the rack or on the shelf of a home entertainment center will increase. What is needed is a printer that has both the input paper tray and the output paper tray toward the front of the printer. What is also needed is a printer or combination printer/scanner/fax having the mechanical paper path and imaging apparatus accessible from the front of the printer or combination machine. This would allow the user to clear paper jams and do some routine maintenance without having to remove the printer or combination machine from the rack or shelf of the home entertainment center. There is also a need for a printer or combination machine which has the control buttons and status indicators on the front of the machine so that the status can be checked or the combination machine can be controlled more easily in the home entertainment environment. There is also a need for a printer or combination machine dimensioned so that it fits comfortably in a rack or on a shelf of an entertainment center. There is also a need to provide for a printer that can be stacked along with other components found in today's home entertainment environment.

SUMMARY OF THE INVENTION

A printer includes a housing which has a user access surface. Attached within the housing is a printer which includes a paper path. The printer also includes a paper input tray and a paper output tray. Both the paper trays are accessible from the user access surface. The user access surface also has an access panel within the user access surface. The paper path is positioned within the housing so that it is accessible through the access panel.

The printer cartridges, which contain the material used to make an image on the paper, such as a toner cartridge for use with a laser printer or one or more ink wells for use with an ink jet printer, are also positioned within the housing of the printer so as to be near the user access surface. The printer cartridges are accessible through the access panel. Optionally, the printer cartridges could also be accessed through a special panel in the user access surface. The user access surface also includes at least one control switch for controlling a function of the printer and a status indicator for indicating the status of the printer so that the function of the printer can be controlled from the user access surface and so that the status indicator can be read from the user access surface of the housing.

Advantageously, users would have a printer or printer/scanner/fax that could be used in a home entertainment center or on a shelf. The printer could be controlled from the user access surface and routine maintenance, such as removing paper jams or changing cartridges of the printer, could also be accomplished from the user access surface. The control buttons and the status buttons could also be actuated and observed from the user access panel. The printer would also have a paper input tray and a paper output tray that could be accessed from the user access surface. In short, the majority of routine tasks that need to take place when using a printer could be accomplished from the user access surface. As a result, most of the time the printer would not have to be removed from the stereo rack or shelf of the home entertainment system. This would also be helpful for users that decide to use the printer as a monitor stand since most tasks could be accomplished from the surface facing the user beneath the monitor.

DETAILED DESCRIPTION OF THE PREFERRED EMBODIMENTS

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1A:
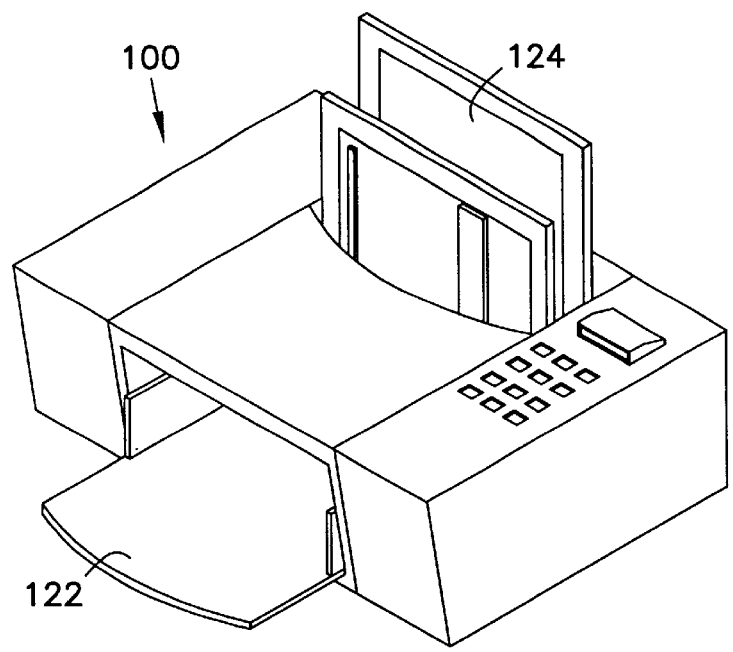
FIG. 1A is an isometric view of a prior art printer.

FIG. 1A is an isometric view of a prior art printer/scanner/fax 100. FIG. 1A shows that on a prior art printer 100 there are many access panels on many surfaces that must remain clear during the operation of the printer 100.

As can be seen, there are several access openings on several of the surfaces of the housing of the printer 100. A top paper tray 760 remains open for access to the input paper path. Of course there are access panels on the top surface for access to the paper path so that paper jams can be removed easily and toner or ink jet cartridges can be replaced. Some printers have additional access panels on the front face and back face for access to electrical cables used to plug into a power source or to carry data to and from the printer. Still other printers also have fold down panels which are associated with alternate paper paths.

The prior art printer 100 could be placed on a rack, however, to add new paper to the input tray, the user would have to remove the printer from the rack or shelf of a home entertainment center. The user may also have to remove the printer from the rack or shelf to clear a paper jam or to perform routine maintenance, depending on the model of printer. In other words, the printer 100 must be removed to gain access to any panels on the back top or sides of the printer 100. In essence, prior art printers or printer scanner fax machines are simply not designed for placement in a home entertainment center.

Figure 1B:
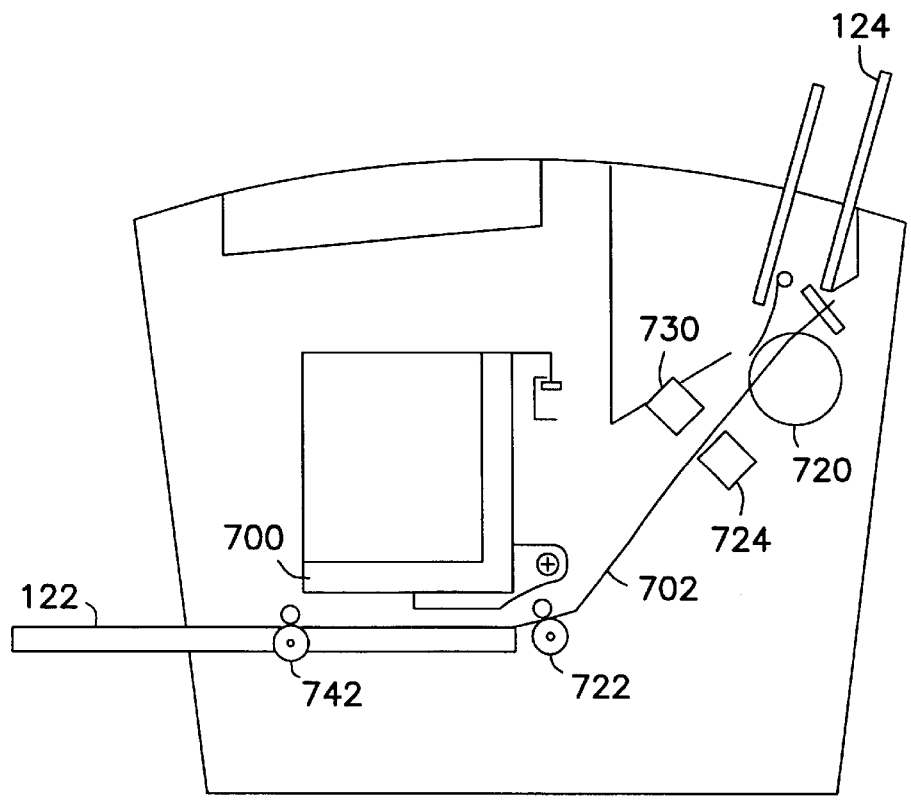
FIG. 1B is a side cross-sectional view of a prior art printer.

FIG. 1B is a side cross-sectional view of the prior art printer/scanner/fax 100 shown in FIG. 1A and having an ink jet printer mechanism 700. The ink jet printer mechanism 700 places the print head 710 close to the paper path 702. A paper take-up cam 720 feeds paper from the paper input tray 124 to a first feed roller 722. The print head sprays ink onto the paper or other medium on which an image is to be printed. The print head 710 is located after the initial feed roller 722. An edge-detect micro switch 724 is located before the print head 710 in the paper path. After paper is fed into the system, the paper edge trips the edge-detect microswitch 724. When the edge-detect microswitch is tripped, the location of the paper is known. The selected margins are accommodated and then the application of to the paper medium can proceed until a prescribed number of print head passes has been achieved. Near the edge-detect microswitch 724, there is a CCD and light bar 730 used for scanning documents. The scanned image that results is either stored directly into a computer or directly faxed. The scanned image can also be subjected to optical character recognition so that a file containing the information can be stored in a computer. This latter option, as mentioned above, requires less storage space.

After the CCD and light bar 730, the paper path 702 routes the paper to the initial roller 722 and an output roller 742 and to the output paper tray 122. The output roller 742 moves the paper or print medium to the paper output tray 122.

Figure 2:
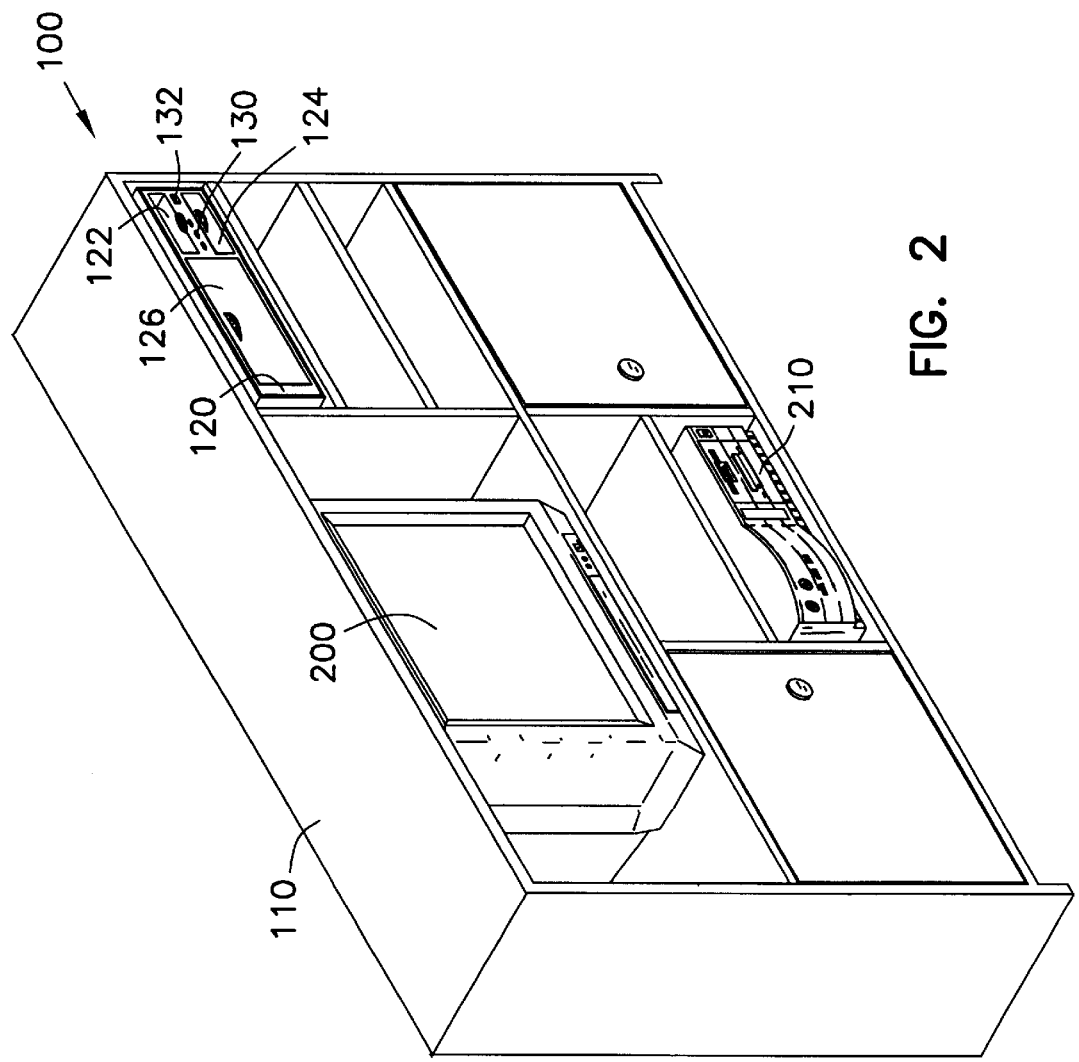
FIG. 2 is an isometric view of a printer stacked or rack mounted in a home entertainment environment.

FIG. 2 is an isometric view of a printer or printer/scanner/fax 100 stacked or rack mounted in a home entertainment environment. The term printer as used in this application can also be used interchangeably or includes a printer/scanner/fax machine or a document input/output device. The printer 100 is shown in a rack or shelf of a home entertainment center 110. As shown in this figure, the printer includes a user-accessible surface 120. The user-accessible surface includes an output paper tray 122, an input paper tray 124, an access panel 126, a series of status indicators 130 and a control switch 132. As can be seen, many of the important functions or tasks can be carried out from the user-accessible surface 120. For example, the input paper tray 124 is a drawer which can be pulled out and paper can be input to the input paper tray 124. The output paper tray is readily accessible from the user-accessible surface 120. In addition, the control switch 132 can be actuated from the user-accessible surface and finally, the status indicators 130 can be seen from the user-accessible surface 120.

Figure 3:
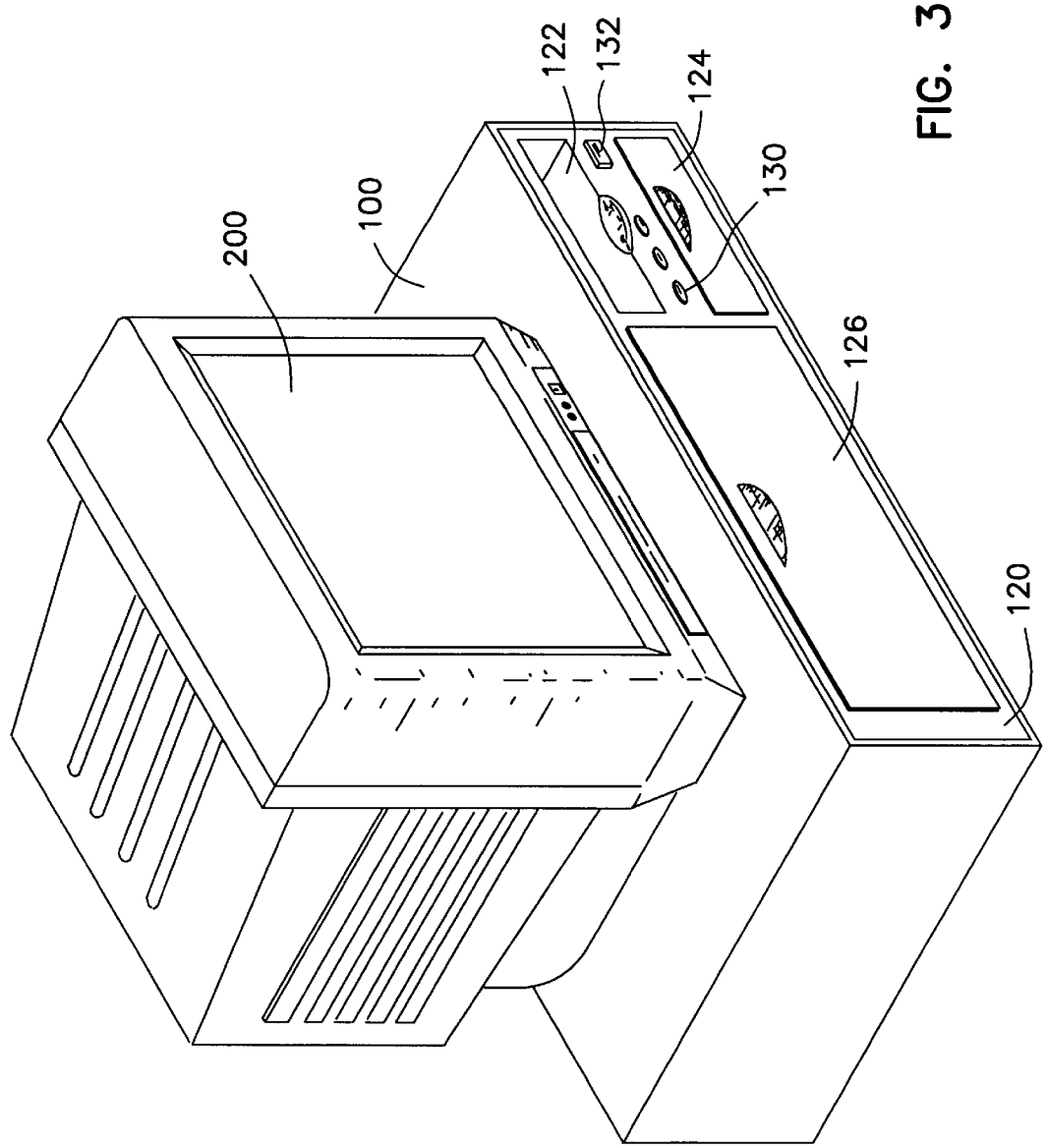
FIG. 3 is an isometric view of a printer and monitor of a computer system wherein the printer is used as a monitor stand.

FIG. 3 is an isometric view of the printer 100 and a monitor 200 of a computer system. The printer 100 is being used as a monitor stand or monitor base. Again, the printer 100 has a user-accessible surface 120. On the user-accessible surface are the control switches 132 and status indicators 130 as well as an access panel 126, an input paper tray and an output paper tray 122. Thus, as mentioned in the previous paragraph, many of the tasks associated with a printer can be carried out from the user-accessible surface 120 of the printer 100.

Figure 4:
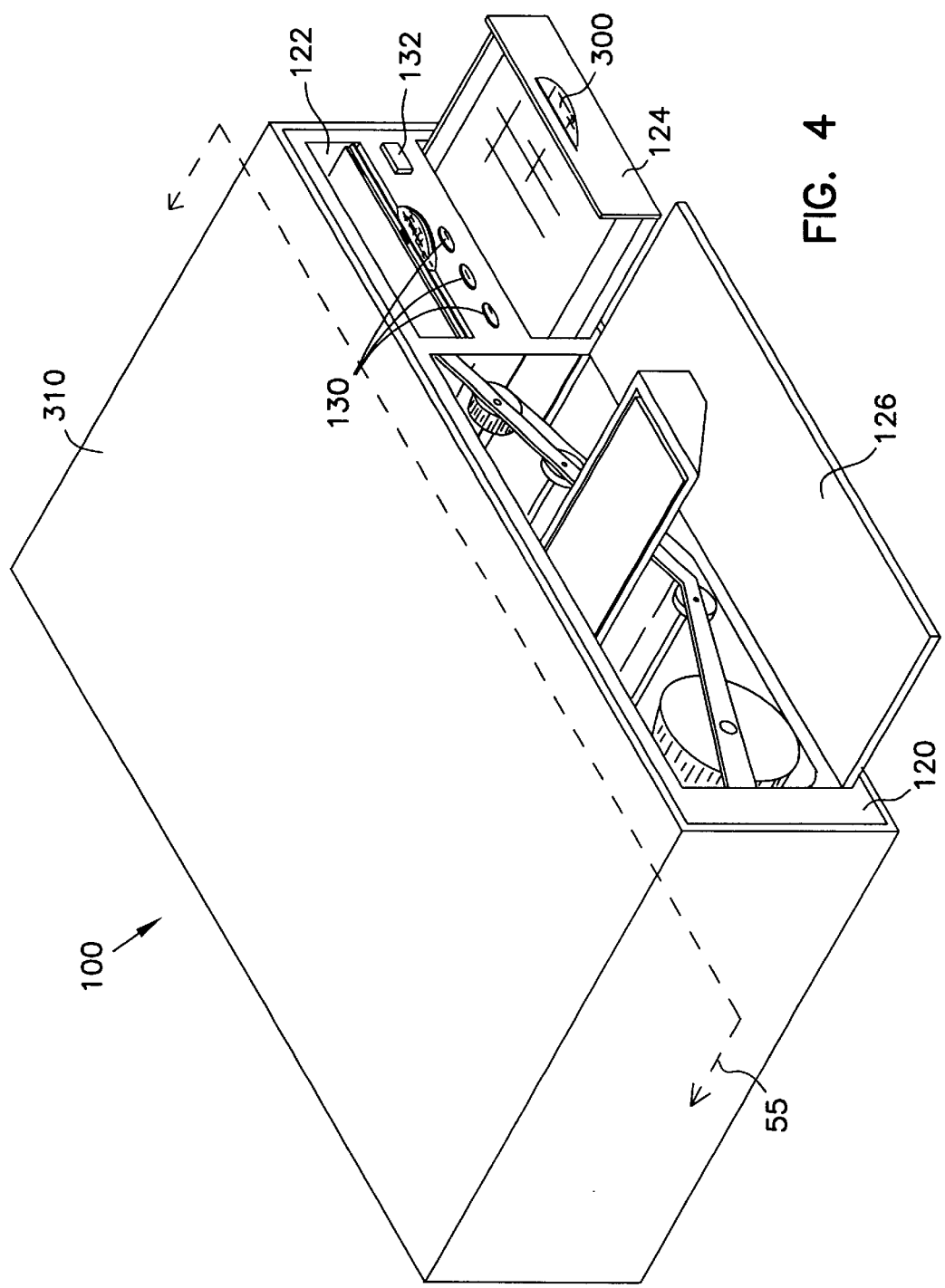
FIG. 4 is an isometric view of the printer or printer/scanner/fax.

FIG. 4 is an isometric view of the printer 100 or of the printer/scanner/fax. In this particular view, several of the portions of the user-accessible surface 120 are shown in an open position. The input paper tray 124 is actually a drawer which can be pulled out from the user-accessible surface 120 using a handle 300. The handle 300 is actually a detente or molded into the front face of the input paper tray 124. The front face of the paper input tray 124 is a molded part which includes a handle and which blends in with the surroundings or other portions of the user-accessible surface 120. The output paper tray 122 is a fixed opening in the user-accessible surface 120. A printer mechanism is attached within the housing 310 near the user accessible surface 120 and specifically near the user access panel 126. The access panel 126 is attached by way of a hinge to an edge of the user-accessible surface 120. Again, the access panel 126 is a molded plastic part which has a handle molded into the plastic part (this is best shown in FIGS. 1 and 2). When a user desires access to the inside of the housing, the access panel 126 is pulled open to rotate about its edge. The user can then access the inside of the housing 310 for the purpose of clearing paper jams or removing or changing out ink wells or toner cartridges, or for another service or maintenance item. Once the service or maintenance task has been completed, the access panel 126 can be rotated back into position so that it is flush with the user-accessible surface 120. The user access panel 126 snaps into place so that it will stay until another maintenance task needs to be performed on the printer 100. FIG. 4 also shows the dimensions or proportions of the various parts of the housing 310. The printer 100 is dimensioned so that it fits within a rack or shelf of the home entertainment center 110 (shown in FIG. 2). The printer 100 is sized so that it fits within a rack or shelf of the home entertainment center 110. The dimensions of the printer 100 are dictated by the size of the rack or shelf for stereo equipment. In other words, the printer 100 is about the same size as stereo equipment so that it will fit on the rack or shelf. The approximate dimensions of this printer 100 are about 17–19 inches in width, 12–15 inches in depth, and approximately 6–7 inches in height. Of course, if the smaller dimensions are used, the printer will fit into most racks or shelves of a home entertainment center 110.

Figure 5:
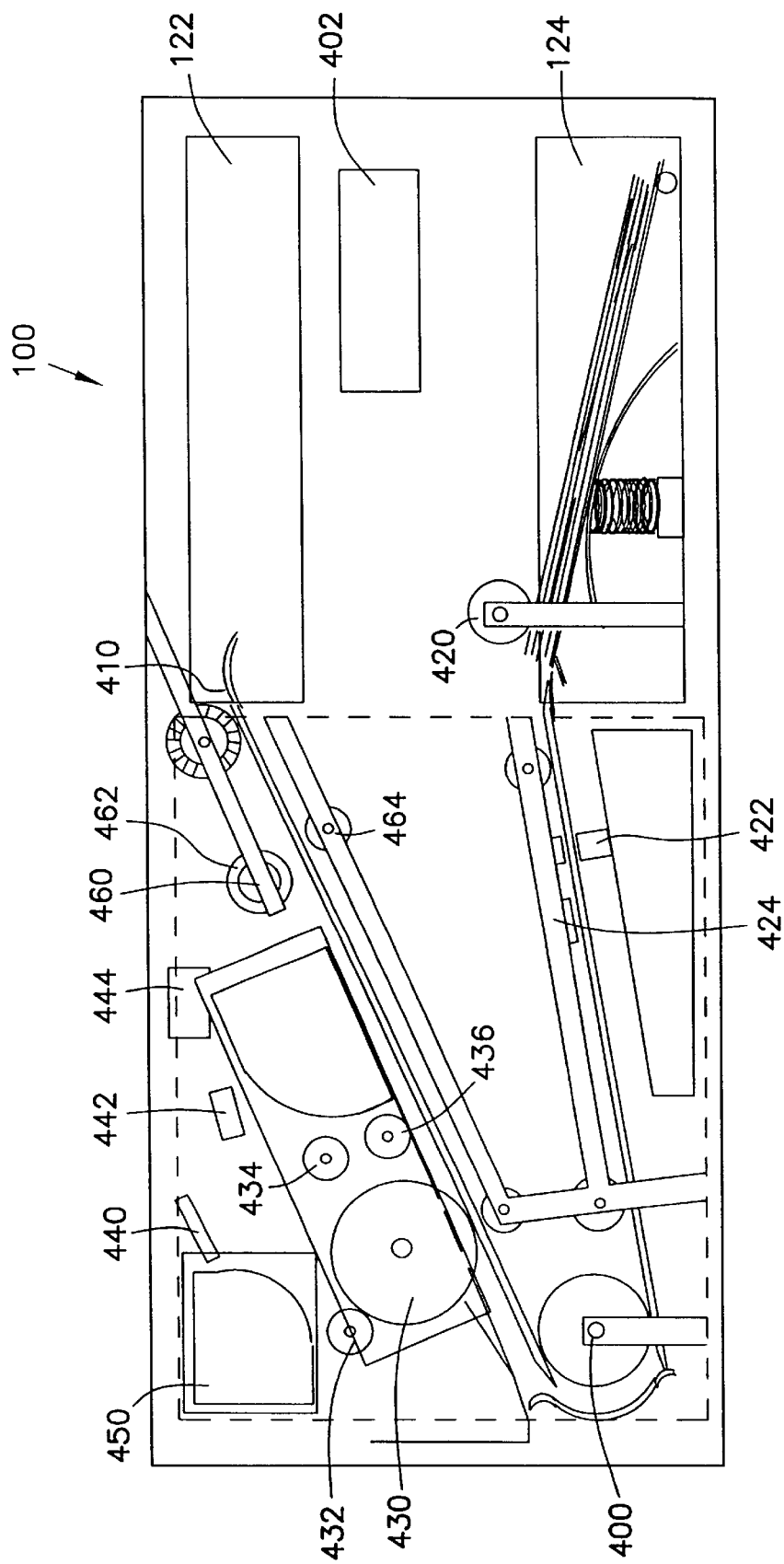
FIG. 5 is a front cross-sectional view of the printer/scanner/fax in which the printer includes a laser printer mechanism.

FIG. 5 is a front sectional view of the printer/scanner/fax in which the printer 100 includes a laser printer mechanism 400. Paper input tray 124 and the paper output tray 122 are shown as the beginning and end, respectively, of the paper path 410 in the printer 100. The printer 100 also includes a controller 402 which controls the operation of the printer 100 as well as the operation of the status indicators 130 (shown in FIGS. 2, 3 and 4). The laser printer mechanism 400 includes a paper take-up cam 420, a paper edge detector 422, a scan CCD and light bar 424 as well as several rollers to enable the paper to be transferred to the area of the printer mechanism 400 where the image is transferred onto the paper. The laser printer mechanism 400 also includes an image drum 430, a developing roller 432, a charge roller 434 and a cleaning roller 436. These rollers contact the image drum 430 at various times during the printing process. The times at which the charge roller 434, the cleaning roller 436 and the developing roller 432 contact the image drum is under the control of controller 402. Toner is placed on the image drum after the image drum has been given a negative charge. An optical system which includes mirror 440, laser diode 442 and a rotating mirror 444 projects an image of the document onto the image drum 430. The electric charge disappears where the light strikes the metal surface of the image drum 430 and only the dark portions of the image drum 430 remain charged. The charged parts of the image drum attract the dark powder or toner from the toner cartridge 450. The dark powder is then transferred to the paper by the image drum 430. A heater assembly or heater device then seals the toner from the toner cartridge 450 to the paper and a warm copy of the document emerges from the printer 100 and into the output paper tray 122. The heater includes an actual heater 460 and a first fuser roller 462 and second fuser pressure roller 464. The scan CCD and light bar 424 are not necessary for the print function of the printer 100. The scan CCD and light bar 424 are used to scan documents which are placed in the input paper tray 124. Once the document is scanned, it is made into an image which can be stored into a computer associated with the printer or the image can be faxed. Of course, the scanned image can be subjected to optical character recognition so that an electronic file can be stored having the information on the document rather than storing an image of the document. Storing the information from the document is advantageous since the amount of storage necessary is much less when compared to storing an image of the document.

Also shown in FIG. 5 is a dotted line which shows the outline of the access panel 126 projected onto this cross-sectional view. As can be seen from the dotted outline of the access panel 126, the user has access to the toner cartridge 450, the paper path 410 and to many of the components of the laser printer mechanism 400. Advantageously, then, the user can change toner cartridges 450 and clear paper paths by merely opening the access panel 126.

Figure 6:
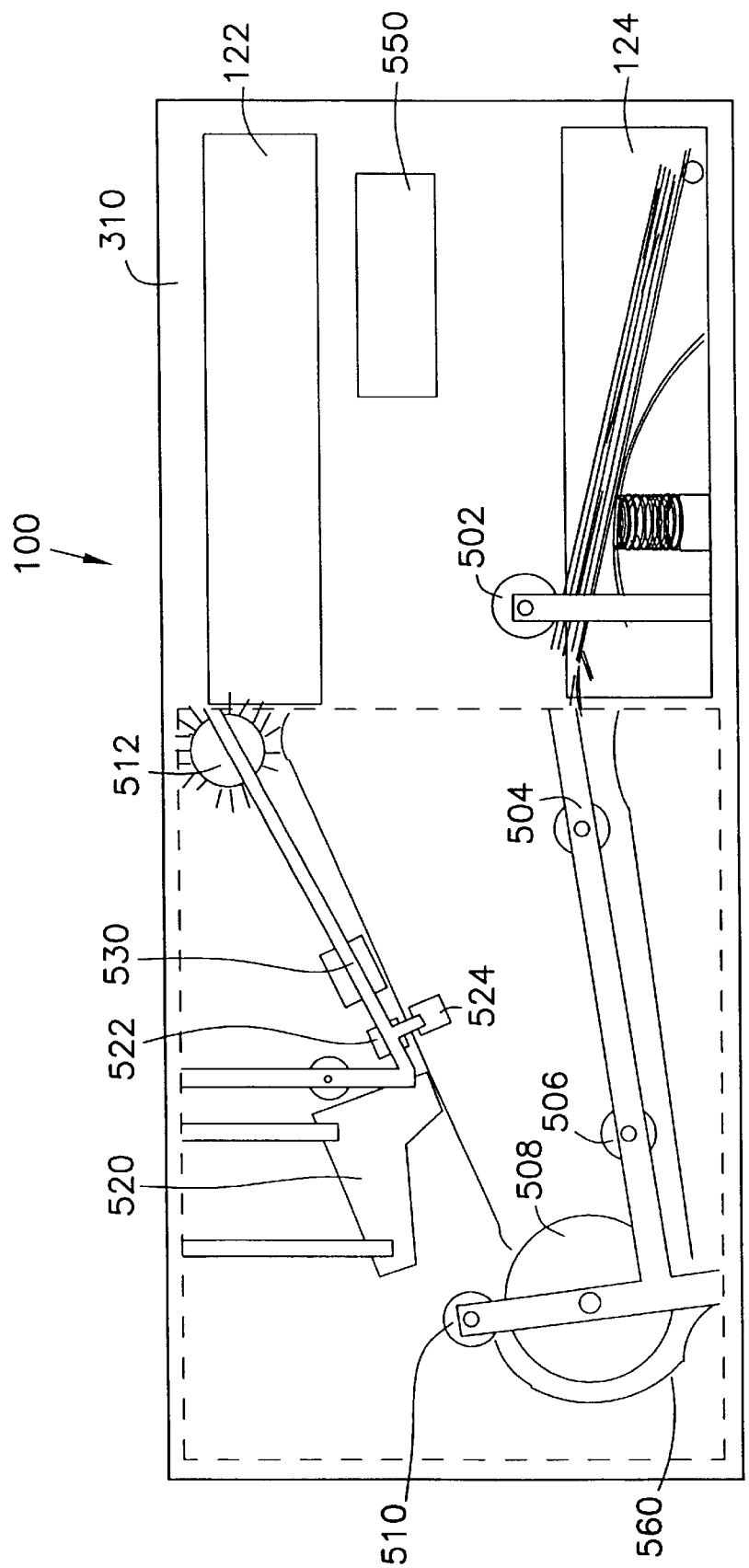
FIG. 6 is a front cross-sectional view of the printer/scanner/fax in which the printer includes an ink jet printer mechanism.

FIG. 6 is a front cross-sectional view of a printer/scanner/fax in which the printer 100 includes an ink jet printer mechanism 500. The ink jet printer mechanism 500 is very similar to the ink jet printer mechanism 700. In fact, the major components are the same. The ink jet printer mechanism 500 includes a paper take-up cam 502 as well as several feed rollers 504, 506, 508 and 510. The ink jet printer mechanism also includes a print head 520 which sprays ink from an ink well onto the surface of the paper. The ink jet printer mechanism 500 also includes an LED 522 and a photodiode paper idle detector 524. The scanning portion of the ink jet printer mechanism 500 includes a scan CCD and light bar 530. The scan CCD and light bar 530 operate the same as the scan CCD and light bar 424 as described above. The ink jet printer mechanism 500 includes an output roller 512 which moves the paper on the paper path to the output paper tray 122.

The printer 100 shown in FIG. 6 also includes a controller 550 which is used to control the various operations of the print mechanism. Also shown in FIG. 6 is a dotted outline of where the access panel 126 will project onto the ink jet printer mechanism 500 within the housing 310 of the printer 100. As can be seen from this projected outline, the paper path as well as many of the components of the ink jet printer mechanism are accessible through the user access panel 126. This also means that many of the tasks necessary to be performed with an ink jet printer can be performed from the user-accessible surface 120 (not shown here, but shown in FIGS. 1, 2 and 3). For example, the print head 520 can be changed and paper jams formed along the paper path are accessible through the user access panel 126.

Figure 7A:
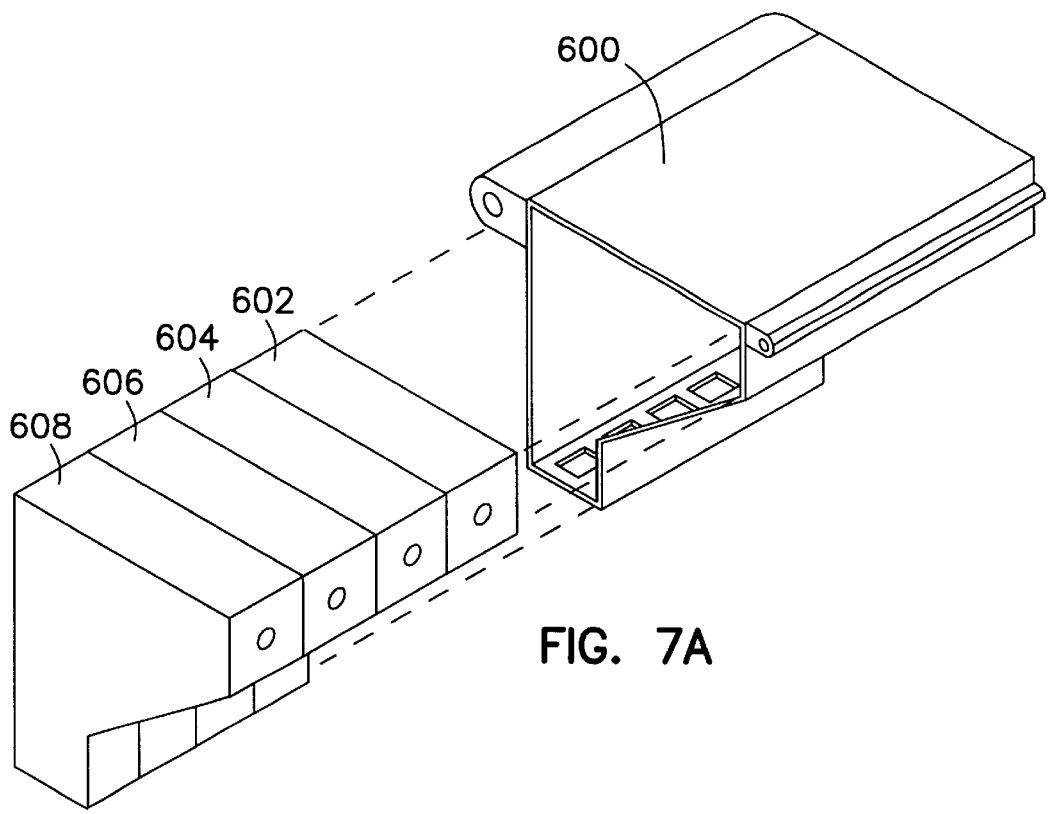
FIG. 7A is an isometric drawing of an inkwell carrier for carrying four different colors of ink for a color ink jet printer.

Now turning to FIG. 7A, an exploded isometric drawing of an ink well carrier for carrying four different colors of ink for a color ink jet printer is shown. As is well known, some ink jet printers are capable of color printouts. The print head 520 shown in FIG. 6 is actually an ink well carrier 600. The ink well carrier 600 holds four individual ink wells 602, 604, 606 and 608. Each of the ink wells 602, 604, 606 and 608 carries one of four individual colors which are used in the color printing process. The ink well carrier 600 facilitates changing of the print head when the ink jet is actually a color-type printer. The ink well carrier 600 containing the four individual ink wells 602, 604, 606 and 608 can then be removed from the printer 100 as shown in FIG. 6, rather than having to remove four different individual ink wells from the ink jet printer mechanism 500. This eases the maintenance task of changing the print head or ink wells in an ink jet-type printer when there are a plurality of ink wells such as are located in a color printer.

Figure 7B:
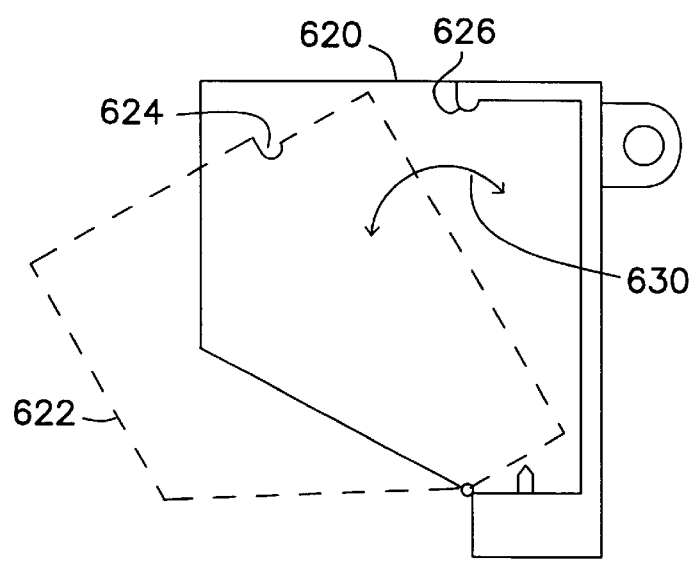
FIG. 7B is an side view of an inkwell carrier for carrying individual ink cartridges for an ink jet printer .

FIG. 7B is an side view of an alternate inkwell carrier 620 for carrying individual ink cartridges 622 for an ink jet printer. One individual ink cartridge 622 is shown in dotted line form in FIG. 7B. The ink cartridge 622 has a recess 624 therein. The recess 624 is located in the outside frame of the ink cartridge 622. The inkwell carrier 620 has a protrusion 626 which fits within the recess 624 of the cartridge 622 to hold it in place with respect to the carrier 620. Installing the cartridge 620 requires that the cartridge 620 be rotated into place as depicted by the arrow 630.

It should be noted that in each application in the printers shown in FIGS. 2–7, the paper is input into the input tray in a different fashion than the prior art printers. Paper or medium to be printed on may have a length or longer dimension and a width or shorter dimension. In prior art printers, the paper or medium to be printed on is placed in a tray so that the paper or medium travels along the paper path of the printer in a direction parallel to the length or longer dimension of the paper or medium. For purposes of this application, this orientation of the paper or medium as it travels through the paper path will be termed the length mode. By contrast, each of the printer mechanisms 400 and 500, which are the subject of this patent application, have paper trays of sufficient width to accommodate the length of the paper. In other words, in each of the printer mechanisms 400 and 500 the paper or medium travels through the paper path in a direction parallel to the width of the paper. For purposes of this application, this orientation of the paper or medium as it travels through the paper path will be termed the width mode. This is best illustrated in FIG. 4. This also necessitates an extra step when scanning a page for fax purposes. When scanned, a virtual copy must be made and placed into memory of the host computer or printer. The page must be reoriented from landscape to portrait before it can be scanned or faxed. Another extra step is required when scanning and applying optical character recognition to the image scanned. A virtual copy of the image must be made and then the image must be rotated 90 degrees within memory so that the optical character recognition can occur in a direction which is parallel to the printed copy on the sheet to be scanned.

As can be seen, there are numerous advantages gained by this printer. First of all, the user has access to the printer through a front access surface 120 and can perform most of the maintenance tasks necessary from the user access panel 126. The user can open an access panel 126 and gain access to the paper path within the print mechanism; they are also able to change print cartridges which contain the material used to make the images. For example in an ink jet printer, the ink wells are accessible and in a laser-type printer, the toner cartridge is available. The input and output trays for the paper or the print medium are also accessible through the front access cover. The beauty of this printer is that it can be placed in a stack of stereo components or on a rack designed for stereo components and can be used without having to remove the printer to do common, ordinary tasks. The printer can also be used as a stand-alone unit or can be used as a monitor stand since the housing 310 is of sufficient strength to allow stacking of either stereo components on the housing or of a monitor 200 on the housing.

Although specific embodiments have been illustrated and described herein, it is appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and the equivalents thereof.

What is claimed is:

1. A document input/output device for use with a computer, said document input/output device comprising:
   a housing having a height dimension, a width dimension and a depth dimension, wherein the height dimension is less than the width or the depth dimension, the housing further comprising a front surface and a top surface; and
   a paper path further comprising:
      a paper input tray in the paper path, said paper input tray accessible from said front surface;
      a paper output tray in said paper path, said paper output tray positionable within the housing and accessible from said front surface; and
      an access panel to the paper path of the document input/output device, said access panel located on said front surface of the housing, the access panel having an open position and a closed position, the top surface of the printer remaining unchanged when the access panel is in the open position.

2. The document input/output device of claim 1 further comprising a cartridge including material for making images, said cartridge accessible from said surface.

3. The document input/output device of claim 2 wherein the cartridge is a toner cartridge.

4. The document input/output device of claim 2 wherein the cartridge is an inkwell.

5. The document input/output device of claim 2 wherein the cartridge is further comprised of a plurality of inkwells, each inkwell holding ink of a different color.

6. The document input/output device of claim 1 further comprising;
   a scanner; and
   a fax.

7. The document input/output device of claim 1 wherein said paper path is located near said front access panel.

8. The document input/output device of claim 7 further comprising;
a scanner; and
a fax.

9. The document input/output device of claim 1 further comprising:
at least one control for controlling a function of the printing device; and
a status indicator for indicating the status of the document input/output device, said at least one control and said status indicator located on said front surface of the housing.

10. The document input/output device of claim 9 further comprising;
a scanner; and
a fax.

11. A printer for use with a computer, said printer comprising:
a housing further comprising a stationary planar front access surface; and
said printer being housed within said housing said printer further comprising:
a paper path along which media travels;
a paper input tray in the paper path, said paper input tray accessible from said planar front access surface;
a paper output tray in said paper path, said paper output tray positionable within the housing and accessible from said planar front access surface; and
an openable access panel within said planar front access surface for accessing said paper path positioned proximate said planar front access panel.

12. The printer of claim 11 further comprising:
at least one control for controlling a function of the printer; and
a status indicator for indicating the status of the printer, said at least one control and said status indicator located on said front access surface of the housing.

13. A printer for use with a computer, said printer comprising:
a housing further comprising a front access surface and a top surface; and
said printer being housed within said housing said printer further comprising:
a paper path along which media travels;
a paper input tray in the paper path, said paper input tray accessible from said front access surface;
a paper output tray in said paper path, said paper output tray positionable within the housing and accessible from said front access surface; and
an access panel within said front access surface, the access panel having an open position and a closed position, the top surface of the printer remaining unchanged when the access panel is in the open position, said paper path positioned proximate said access panel, wherein said media travels along the paper path in width mode.

14. A printer for use with a computer, said printer comprising:
a housing further comprising a front access surface and a top surface; and
said printer being housed within said housing said printer further comprising:
a paper path along which media travels;
a paper input tray in the paper path, said paper input tray accessible from said front access surface;
a paper output tray in said paper path, said paper output tray accessible from said front access surface; and
an access panel within said front access surface, the access panel having an open position and a closed position, the top surface of the printer remaining unchanged when the access panel is in the open position, said paper path positioned proximate said access panel, wherein said media travels along the paper path in width mode, wherein the paper input tray is orientated so that the width of the paper is near the access surface.

15. A document input/output device for use in a stereo rack or shelf of a home entertainment center, said document input/output device comprising:
a housing having a height dimension, a width dimension and a depth dimension, wherein the height dimension is less than the width or the depth dimension, the housing including a planar front access surface;
a mechanism for moving media through the document input/output device and attached to said housing, said mechanism unattached to said planar front access surface and located near said planar front access surface;
an access panel located within the planar front access surface which allows access to the mechanism for moving paper through the document input/output device;
a paper input tray having an access portion in said planar front access surface; and
a paper output tray having an access portion in said planar front access surface, the paper output tray positionable within the housing.

16. The document input/output device of claim 15 further comprising at least one cartridge including material for making images, said cartridge positioned within said housing proximate said planar front access surface.

17. The document input/output device of claim 16 wherein said at least one cartridge including material for making images, said cartridge accessible from said planar front access surface and through said access panel.

18. The document input/output device of claim 15 further comprising:
at least one control for controlling a function of the document input/output device; and
a status indicator for indicating the status of the document input/output device, said at least one control and said status indicator located on said planar front access surface of the housing.

19. A document input/output device for use in a stereo rack or shelf of a home entertainment center, said document input/output device comprising:
a housing including an access surface;
a mechanism for moving media through the document input/output device and attached to said housing, said mechanism located near said access surface;
an access panel located within the access surface which allows access to the mechanism for moving paper through the document input/output device;
a paper input tray having an access portion in said access surface; and
a paper output tray having an access portion in said access surface, wherein the paper input tray comprises a drawer, said drawer further comprising:
a drawer face; and a handle attached to said drawer face, said drawer face forming a portion of said access surface.

20. A document input/output device for use in a stereo rack or shelf of a home entertainment center, said document input/output device comprising:

a housing having a height dimension, a width dimension and a depth dimension, wherein the height dimension is less than the width or the depth dimension, the housing including a planar access surface;

a mechanism for moving media through the document input/output device and attached to said housing, said mechanism unattached to said access surface and located near said planar access surface;

an access panel located within the planar access surface which allows access to the mechanism for moving paper through the document input/output device;

a paper input tray having an access portion in said planar access surface; and a paper output tray having an access portion in said planar access surface.

* * * * *